(12) United States Patent
Arnelöf et al.

(10) Patent No.: US 10,451,170 B2
(45) Date of Patent: Oct. 22, 2019

(54) LUBRICATION SYSTEM AND A METHOD FOR CONTROLLING THE LUBRICATION SYSTEM

(71) Applicant: Scania CV AB, Södertälje (SE)

(72) Inventors: Per Arnelöf, Vendelsö (SE); Jörgen Forsberg, Mariefred (SE)

(73) Assignee: Scania CV AB, Södertälje (SE)

( * ) Notice: Subject to any disclaimer, the term of this patent is extended or adjusted under 35 U.S.C. 154(b) by 216 days.

(21) Appl. No.: 15/527,939

(22) PCT Filed: Nov. 30, 2015

(86) PCT No.: PCT/SE2015/051279
§ 371 (c)(1),
(2) Date: May 18, 2017

(87) PCT Pub. No.: WO2016/089287
PCT Pub. Date: Jun. 9, 2016

(65) Prior Publication Data
US 2018/0087655 A1    Mar. 29, 2018

(30) Foreign Application Priority Data

Dec. 4, 2014 (SE) ...................................... 1451478

(51) Int. Cl.
*F16H 57/04* (2010.01)
*F16H 3/091* (2006.01)

(52) U.S. Cl.
CPC ......... *F16H 57/0435* (2013.01); *F16H 3/091* (2013.01); *F16H 57/043* (2013.01);
(Continued)

(58) Field of Classification Search
CPC ............. F16H 57/0435; F16H 57/0409; F16H 57/043; F16H 57/0434; F16H 57/0441;
(Continued)

(56) References Cited

U.S. PATENT DOCUMENTS

| 4,721,185 A | 1/1988 | Weigle |
| 2014/0172250 A1 | 6/2014 | Tamai et al. |

(Continued)

FOREIGN PATENT DOCUMENTS

| DE | 3516710 A1 | 11/1986 |
| DE | 19950423 A1 | 4/2001 |

(Continued)

OTHER PUBLICATIONS

International Search Report for PCT/SE2015/051279 dated Dec. 9, 2015.

(Continued)

*Primary Examiner* — William E Dondero
*Assistant Examiner* — Robert T Reese
(74) *Attorney, Agent, or Firm* — Moore & Van Allen PLLC; W. Kevin Ransom

(57) ABSTRACT

The invention relates to a lubrication system and a-method for controlling the lubrication system. The lubrication system comprises a bypass line by which it is possible to lead a part of the oil flow in the oil line past a component to be lubricated and back to the oil sump, a first valve configured to regulate the oil flow through the bypass line and a control unit. The control unit is configured to receive information from at least one parameter related to the oil flow to said component to estimate a required oil flow to said component in view of said parameter and to regulate the first valve such that a part of the oil flow in the oil line is led to the bypass line and that a remaining part of the oil flow, which corresponds to the required oil flow, is led to said component.

19 Claims, 3 Drawing Sheets

(52) U.S. Cl.
CPC ....... *F16H 57/045* (2013.01); *F16H 57/0409* (2013.01); *F16H 57/0436* (2013.01); *F16H 57/0441* (2013.01); *F16H 57/0447* (2013.01); *F16H 57/0449* (2013.01); *F16H 57/0452* (2013.01); *F16H 57/0456* (2013.01); *F16H 57/0471* (2013.01); *F16H 57/0484* (2013.01); *F16H 57/0494* (2013.01); *F16H 57/042* (2013.01); *F16H 57/0431* (2013.01)

(58) Field of Classification Search
CPC ............. F16H 57/0447; F16H 57/0449; F16H 57/045; F16H 57/0452; F16H 57/0456; F16H 57/0471; F16H 57/0484; F16H 57/0494; F16H 57/042; F16H 57/0431; F16H 3/091
See application file for complete search history.

(56) References Cited

U.S. PATENT DOCUMENTS

2018/0058570 A1\* 3/2018 Osborn ............... F16H 57/0495
2019/0056026 A1\* 2/2019 Dalum ................ F16H 57/0435

FOREIGN PATENT DOCUMENTS

| DE | 10308560 A1 | 9/2004 |
| DE | 102005013657 A1 | 9/2006 |
| DE | 102008063608 A1 | 7/2009 |
| WO | 2008076061 A1 | 6/2008 |

OTHER PUBLICATIONS

Written Opinion of the International Searching Authority for PCT/SE2015/051279 dated Dec. 9, 2015.
International Preliminary Report on Patentability for International Patent No. PCT/SE2015/051279 dated Jun. 6, 2017.
European Search Report for European Patent Application No. EP15865714 dated May 30, 2018.
Supplementary European Search Report for European Patent Application No. EP15865714 dated May 22, 2018.
Korean Office Action for Korean Patent Application No. 10-2017-7017453 dated Aug. 1, 2018.

\* cited by examiner

LUBRICATION SYSTEM AND A METHOD FOR CONTROLLING THE LUBRICATION SYSTEM

CROSS-REFERENCE TO RELATED APPLICATION(S)

This application is a national stage application (filed under 35 § U.S.C. 371) of PCT/SE15/051279, filed Nov. 30, 2015 of the same title, which, in turn claims priority to Swedish Application No. 1451478-0 filed Dec. 4, 2014 of the same title; the contents of each of which are hereby incorporated by reference.

FIELD OF THE INVENTION

The present invention relates to a lubrication system and a method for controlling the lubrication system.

BACKGROUND OF THE INVENTION

Conventional gearboxes comprise a main shaft, a counter shaft, a plurality of gearwheel pairs each comprising a primary gearwheel arranged on the counter shaft and a secondary gearwheel rotatably arranged on the main shaft by means of roller bearings. The primary gearwheel and the secondary gearwheel of the respective gearwheel pairs are continuously in meshing engagement with each other. The primary gearwheels on the counter shaft are positioned at a lower level than the secondary gearwheels on the main shaft. The gearbox comprises an oil sump at a bottom portion. The oil sump is filled with gearbox oil up to a level such that substantially all primary gearwheels are continuously in contact with the oil in the oil sump. During operation, the primary gearwheel of the respective gearwheel pairs distributes oil from the oil sump up to its meshing engagement with the secondary gearwheel. The oil provides lubrication and cooling of the meshing engagement of the gearwheels.

A pump pumps continuously oil from the oil sump to the roller bearings of the secondary gearwheels via an oil channel in the main shaft. The oil flow to the roller bearings is dimensioned such that the roller bearings obtain a required lubrication and cooling when they are heavily loaded. During operating situations when the roller bearings are less loaded, the oil flow to the roller bearings is unnecessary large. As a consequence, the pump consumes more energy than necessary during operating situations when they are less loaded. Furthermore, the too large quantity of oil supplied to the roller bearings results in unnecessary rolling losses in the roller bearings. Consequently, the power losses in the gearbox are unnecessary large during operating situations when the roller bearings are less loaded.

The oil sump comprises a substantially constant oil level defining an immersion depth of the respective primary gearwheels into the oil at which a required lubrication and cooling of the meshing engagement of the gearwheel pairs during operating situations when a maximum torque is transmitted through the gearbox. As a consequence, the immersion depth is unnecessarily large when a lesser torque is transmitted through the gearbox and when certain gears are engaged in the gearbox and especially when a direct-gear is engaged in the gearbox. In the latter case, the torque in the gearbox is directly transmitted from an input shaft to the main shaft of the gearbox. Since the torque is not transmitted via anyone of the gearwheel pairs, the oil supply to the meshing engagements between the primary gearwheels and the secondary gearwheels is redundant. The counter shaft obtains a rotary resistance when the primary gearwheels rotates in contact with oil in the oil sump. Consequently, a constant high oil level in the oil sump results in unnecessary power losses in the gearbox due to the rotary resistance when certain gears are engaged in the gearbox and especially when a direct-gear is engaged.

WO 2008/076061 shows a gearbox with a main shaft and a counter shaft supporting a number of gearwheel pairs. During direct-drive operation in the gearbox, the normal oil level in the gearbox is temporarily lowered such that the gearwheels on the counter shaft rotate without contact with the oil in the oil sump. The oil level is raised back to normal level as soon as the direct drive gear is disengaged. An oil gathering tank is arranged in the gear box. The oil gathering tank comprises an inlet arranged in a position such it receives oil splash from the gearwheels on the counter shaft when they come in contact with the oil. The oil flows out from the gathering tank and back to the oil sump via an outlet of the gathering tank regulated by a valve.

SUMMARY OF THE INVENTION

The object of the present invention is to provide a lubrication system providing a required lubrication and cooling of including components in a gearbox at the same time as it is possible to reduce power losses in the gearbox.

The above mentioned object is achieved by the lubrication system described herein. The control unit receives information from one or several parameters related to the oil flow to the component. In view of this information, the control unit estimates a required oil flow to the component. During operating situations when, for example, the component is heavily loaded, the control unit closes the oil flow through the bypass line so that the entire oil flow is led to the component. During operating situations when the component is less loaded, the control unit leads a suitable part of the oil flow to the bypass line such that a remaining part of the oil flow, which corresponds to the estimated required oil flow, is led to the component. The flow losses in the bypass line are considerably lower than the flow losses in the narrow oil passages in the vicinity of the component. When a part of the oil flow in the oil line is led to the bypass line, the flow losses in the oil line will decrease resulting in less energy consumption of the pump pumping oil through the oil line.

According to an embodiment of the invention, the first valve is arranged in the bypass line. In this case, the first valve regulates the oil flow through the bypass line. The oil flow to the component will be the remaining part of the entire oil flow through the oil line. The first valve may be positionable in a closed position and in least one open position. Preferably, the first valve is positionable in a plurality of open position in which different large parts of the oil flow in the oil line is led through the bypass line. The first valve may be positionable to different open positions in a step-less manner.

According to an embodiment of the invention, the oil line has an extension from the oil sump to a component in the form of a roller bearing in the gearbox. The required oil flow to a roller bearing is, for example, depending on the loading. A too large oil flow to a roller bearing results in rolling losses. In this case, the estimated required oil flow will always give the rolling bearing a required lubrication and cooling. Unnecessarily large oil flows to the roller bearing is prevented resulting in lower rolling losses in the roller bearings. The roller bearing may be a roller bearing supporting a secondary gearwheel on the main shaft and/or a roller bearing supporting a rotary shaft in the gearbox such as an input shaft or the main shaft.

According to an embodiment of the invention, the bypass line may comprises a reservoir configured to store a variable amount of the oil in the gearbox in order to adjust the oil level in the oil sump. The quantity of oil in a gearbox is constant. If an amount of the oil is stored in a reservoir, the amount of oil in the oil sump will decrease in a corresponding manner and thus the oil level in the oil sump. When, for example, a direct-gear is engaged, the torque is not transmitted via the gearwheel pairs in the gearbox. In this case, it is suitable to establish an oil level in the oil sump below all primary gearwheels on the counter shaft in order to reduce the rotary resistance of the primary gearwheel and the counter shaft in an optimally manner. Furthermore the primary gearwheels on the counter shaft are of different sizes. When the torque is transmitted via a gearwheel pair comprising a primary gearwheel of a large size it is possible to establish an oil level in the oil sump located below the smaller sized primary gearwheels on the counter shaft. Also in this case, the counter shaft obtains a decreased rotary resistance.

According to an embodiment of the invention, the lubrication system comprises a second valve by which the control unit regulates the oil flow from the reservoir to the oil sump. It is possible to quickly increase the amount of oil in the reservoir and lowering the oil level in the oil sump by positioning the second valve in a closed position. In this case, all oil supplied to the reservoir will be maintained in the reservoir. It is possible to decrease the amount of oil in the reservoir and raising the oil level in the oil sump by positioning the second valve in an open position in which the oil flow from the reservoir is higher than the oil flow to the reservoir. It is possible to accelerate the lowering process of the oil level by positioning the first valve in a closed position. The second valve may be positionable between a closed position and at least one open position. Preferably, the second valve is positionable in a plurality of open position in which varying amounts of the oil in the reservoir is led to the oil sump. The second valve may be movable arranged between different open positions in a step-less manner.

According to an embodiment of the invention, the oil line comprises a return line configured to lead oil from the reservoir to the oil sump. Preferably, the reservoir is arranged at a higher level than the oil sump. In this case, the oil will flow from the reservoir to the oil sump by the gravity. Thus, no pump need to be used for conducting oil from the reservoir to the oil sump. In this case, the reservoir may comprise an outlet opening at a bottom portion through which the oil leaves the reservoir and flows down to the oil sump.

According to an embodiment of the invention, the lubrication system comprises a sensor configured to sense the oil level in the oil sump. Such a sensor may include a float or the like sensing the level of the oil in the oil sump. Thereby, it is possible for the control unit to be continuously aware of the actual oil level in the oil sump which facilitate the adjustment of the oil level when, for example, a new gear is to be engaged in the gearbox.

According to an embodiment of the invention, said parameter may be one of the following parameters the gear engaged in the gearbox, the torque transmitted through the gearbox, the temperature of the oil in the gearbox, the inclination of the gearbox, GPS information, properties of the oil used in the gearbox, properties of the used gearbox, stored data from previous operation of the lubrication system, the temperature of the surrounding, the temperature of a coolant in a cooling system used to cool the oil in the gearbox and information of activation of a brake such as a retarder.

The gear engaged in the gear box is a parameter that can define a suitable oil level in the gearbox in order to reduce the rotary resistance of the counter shaft in an optimal manner. Especially when the direct-gear is engaged in the gearbox, it is possible to reduce the rotary resistance significantly by lowering the oil level in the oil sump. The torque transmitted in the gearbox may define a required oil flow to the component. The cooling properties of the oil are related to the temperature of the oil. Also the lubrication properties of the oil may vary with the temperature. The inclination of the gearbox effects the oil level in relation to the primary gearwheels on the counter shaft. GPS information about the topography of the road ahead makes it possible to plan in advance the adjustment of the oil flow to the component and the oil level in the oil sump. The properties of the used oil are a relevant parameter in order to provide an oil flow resulting in a required lubrication of the component. Stored data from previous operation of the lubrication system can be helpful in order to estimate a required oil flow to the component and a suitable oil level in the oil sump. The temperature of the surrounding and the temperature of a coolant in a cooling system influences on the temperature of the oil in the gearbox. The information of activation of a brake such as a retarder makes it possible to increase the oil level in the oil sump during a braking process in order to provide a rotary resistance in the gearbox adding a complementary braking action to the ordinary braking process.

BRIEF DESCRIPTION OF THE DRAWINGS

In the following a preferred embodiment of the invention is described, as an example, with reference to the attached drawings, in which.

DETAILED DESCRIPTION OF THE INVENTION

Figure 1:
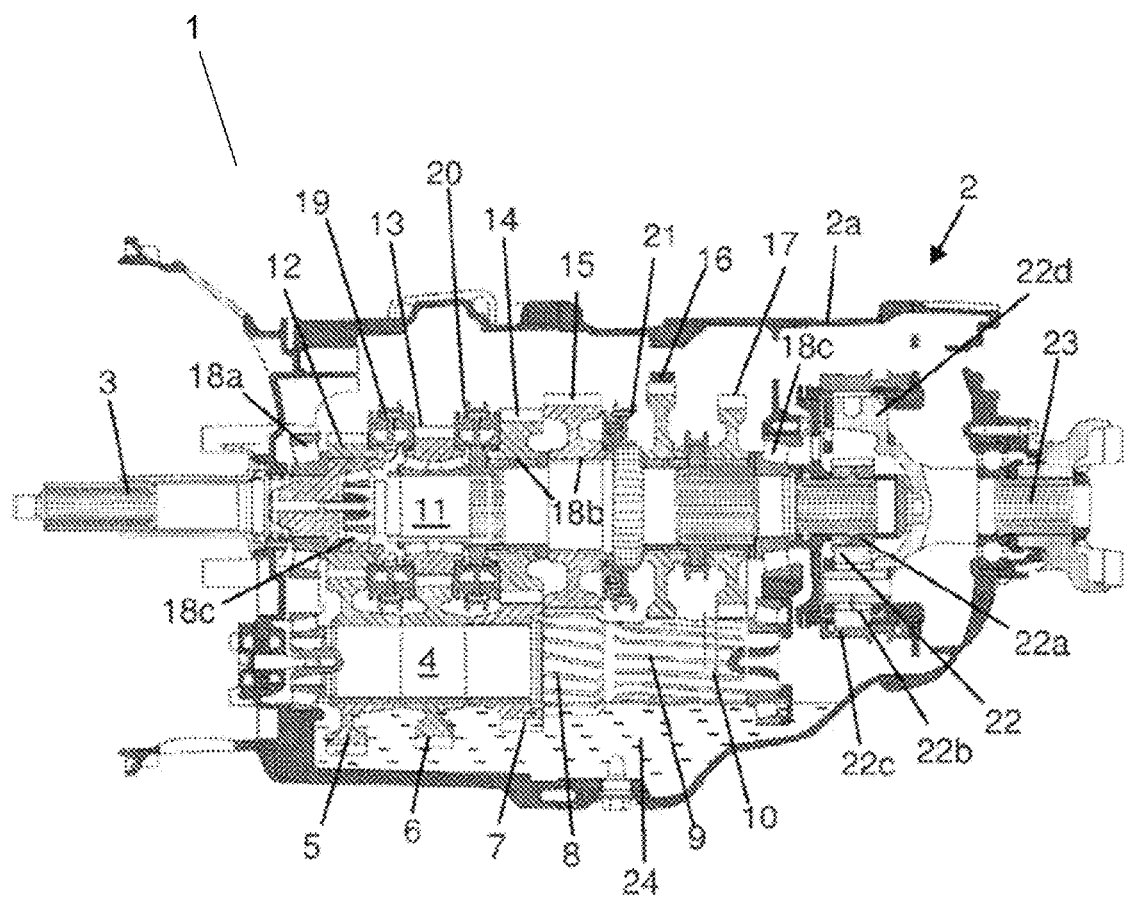
FIG. 1 shows a gearbox in a vehicle.

FIG. 1 shows a gearbox 2 arranged in a schematically indicated vehicle 1. The vehicle 1 may be a heavy vehicle. The gearbox 2 comprises a housing 2a and an input shaft 3 driven by a not shown combustion engine. The gearbox comprises further a counter shaft 4 provided with a plurality of gearwheels 5-10 of different sizes. In this case, the gearwheels 5-10 are fixedly arranged on the counter shaft 4. The gearbox 2 comprises a main shaft 11 provided with a plurality of gearwheels 12-17 of different sizes. Each gearwheel on 5-10 the counter shaft 4 is in constant engagement with a gearwheel 12-17 on the main shaft 11 such that they form a number of gearwheel pairs in the gearbox 2. Each gearwheel pair includes a primary gearwheel 5-10 fixedly arranged on the counter shaft 4 and secondary gear wheel 12-17 rotatably arranged on the main shaft 11 or the input shaft 3.

The gearbox 2 is equipped with a split gear which in a first split position connects the input shaft 3 with the counter shaft 4 via a first gearwheel pair 5, 12 and which in a second split position connects the input shaft 3 with the counter shaft 4 via a second gearwheel pair 6, 13. The second gearwheel pair 6, 13 provides a ratio that defines a third gear in the gearbox 2. The gearbox 2 further includes a third gearwheel pair 7, 14 which defines a second gear in the gearbox 2, a fourth gearwheel pair 8, 15 that defines a first gear in the gearbox 2, a fifth gearwheel pair 9, 16 which defines a creep gear and a sixth gearwheel pair 10, 17 that define a reverse gear. The sixth gearwheel pair 10, 17 includes an intermediate gearwheel which provides a reverse rotation of the main shaft 11.

The input shaft 3 is rotatably arranged in the gearbox 2 by means of a roller bearing 18*a*. The secondary gearwheels 12-17 are rotatably arranged on the main shaft 11 by means of roller bearings 18*b* that can be needle bearings. The main shaft 11 is rotatably arranged by means of two roller bearings 18*c*. Synchronizing units 19-21 are disposed adjacent to the secondary gear wheels 12-15 of the main shaft 11. Each synchronizing unit 19-21 is configured to synchronize and lock at least one of the secondary gear wheels 12-15 on the main shaft 11. A first synchronizing unit 19 has the task to establish the different split positions. The first synchronizing unit 19 is able to connect the input shaft 3 with the counter shaft 4 in the gearbox 2, via the first gearwheels pair 5, 12 in a first split position and, via the second gearwheels pair 6 13, in a second split position. A second synchronization unit 20 is configured to synchronize and lock the secondary gearwheels 13, 14 on the main shaft 11. A third synchronizing unit 21 is adapted to synchronize and lock the secondary gearwheel 15 on the main shaft 11. Furthermore, it is possible by the first synchronizing unit 19 and the second synchronizing unit 20 to provide a direct connection between the input shaft 3 and the main shaft 11 and provide a direct-drive gear in the gearbox 2.

The gearbox also includes a range gear 22 which connects the main shaft 11 to an output shaft 23 of the gearbox. The range gear 22 comprises a sun wheel 22*a* fixedly arranged on the main shaft 11, planetary wheels 22*b*, a coupling sleeve 22*c* and a planetary carrier 22*d*. By means of the range gear 22, all ordinary gears in the gearbox 2 can be provided with a high range gear or a low range gear. Thus, the range gear 22 provides the gearbox 2 with twice as many gears. A lower portion of the housing 2*a* comprises an oil sump 24. The oil sump 24 is to be filled with gearbox oil. During operation, the primary gearwheel 5-10 of the respective gearwheel pairs distributes oil from the oil sump 24 up to a meshing engagement with the secondary gearwheel 12-17. The oil provides lubrication and cooling of the meshing engagement between the primary gearwheel 5-10 and the secondary gearwheels 12-17.

Figure 2:
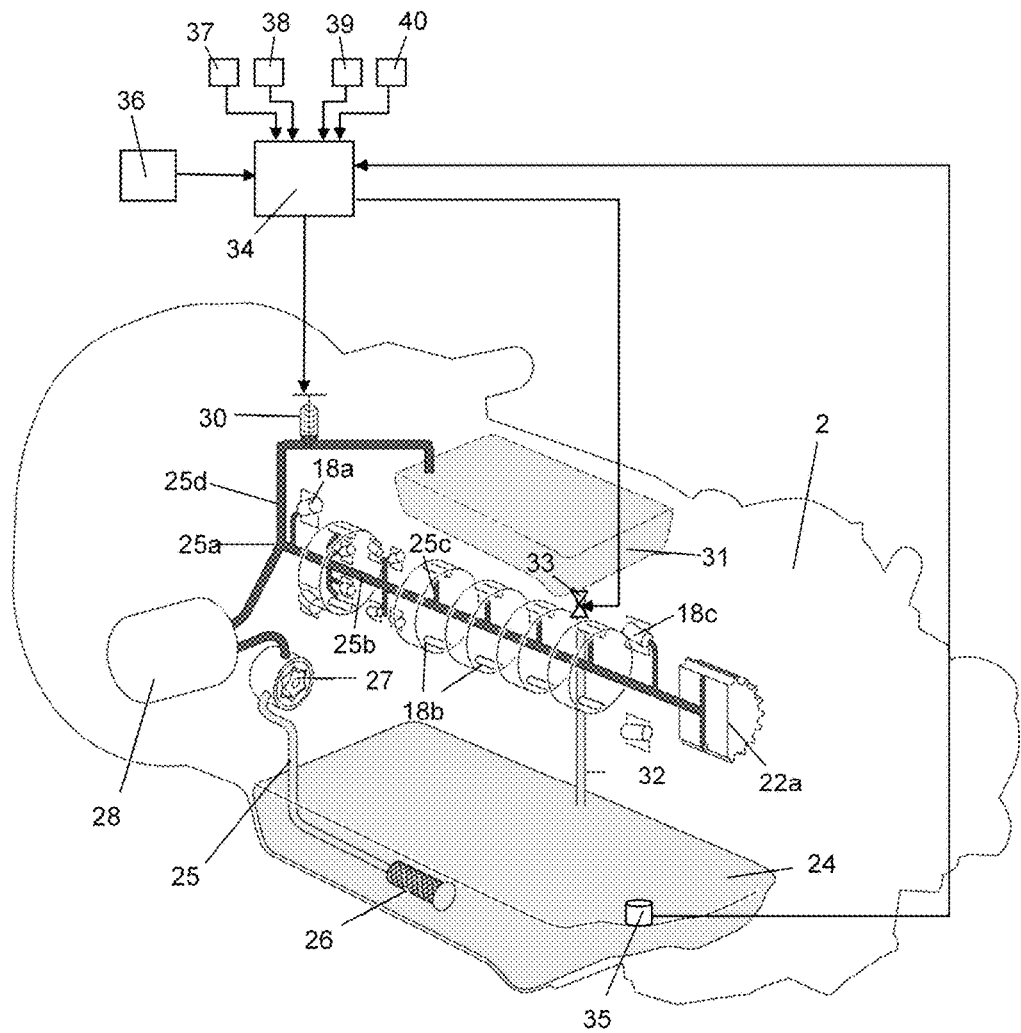
FIG. 2 shows a lubrication system for the gearbox according to the invention.

FIG. 2 shows a lubrication system in the gearbox 2. The lubrication system comprises an oil line 25. The oil line 25 receives oil, via a suction strainer 26, arranged at a bottom portion of the oil sump 24. The oil line 25 comprises a pump 27 pumping oil through the oil line system 25 and an oil filter 28. The oil line 25 is branched at a point 25*a* in an ordinary portion 25*b*, 25*c* and in a bypass line 25*d*. The ordinary portion comprises an axial oil channel 25*b* arranged into the main shaft 11 and radial oil channels 25*c* arranged at different axial positions along the axial oil channel 25*b*. The radial oil channels 25*c* lead oil to the roller bearing 18*a* supporting the input shaft 3, the roller bearings 18*b* supporting the second gear wheels 12-17 on the main shaft 11 and the roller bearings 18*c* supporting the main shaft 11. Furthermore, the axial oil channel 25*b* leads oil to the sun wheel 22*a* of the range gear 22. The oil lubricates and cools the roller bearings 18*a*-18*c* and the meshing engagement between the sun wheel 22*a* and the planetary wheels 22*b* of the range gear 22. The used oil flows down into the oil sump 24. The bypass line 25*d* comprises a first valve 30, an oil reservoir 31 and a return line 32 leading oil from the receiver 31 to the oil sump 24. The oil flow through the return line 32 is controlled by a second valve 33. Thus, the oil in the bypass line 25*d* is conducted past the components in the form of roller bearings 18*a*-18*c* and the sun wheel 22*a* in the ordinary portion of the oil line 25.

A control unit 34 controls the first valve 30 and the second valve 33. When it sets the first valve 30 in a closed position, the oil flow through the bypass line 25*d* is closed. In this case, the entire oil flow is led to the roller bearings 18*a*-18*c* and the sun wheel 22*a*. When the valve 30 is set in a more or less open position, a part of the oil will flow through the bypass line 25*d* and a remaining part of the oil will flow to the bearings 18*a*-18*c* and the sun wheel 22*a*. When the second valve 33 is set in an open position, the oil in the reservoir 31 flows from the reservoir 31, via a return line 32, to the oil sump 24. When the second valve 33 is in a closed position, the return line 32 is blocked and oil will be maintained in the reservoir 31.

The control unit 34 is able to establish a variable oil level in the reservoir 31 by means of the first valve 30 and the second valve 33. The control unit 34 receives information from a float 35 about the actual oil level in the gearbox 2. The control unit 34 controls the first valve 30 and the second valve 33 by means of information from a number of operational parameters. In this case, the control unit 34 receives information from a gear change unit about a first parameter 36 related to the gear engaged in the gearbox 2, information about a second parameter 37 about actual torque in the gearbox 2, information from a sensor about a third parameter 38 related to the inclination of the vehicle 1, information from a sensor of a fourth parameter 39 related to the temperature of the oil in the gearbox and information from a GPS unit about a fifth parameter 40 regarding the topography of the road ahead.

Figure 3:
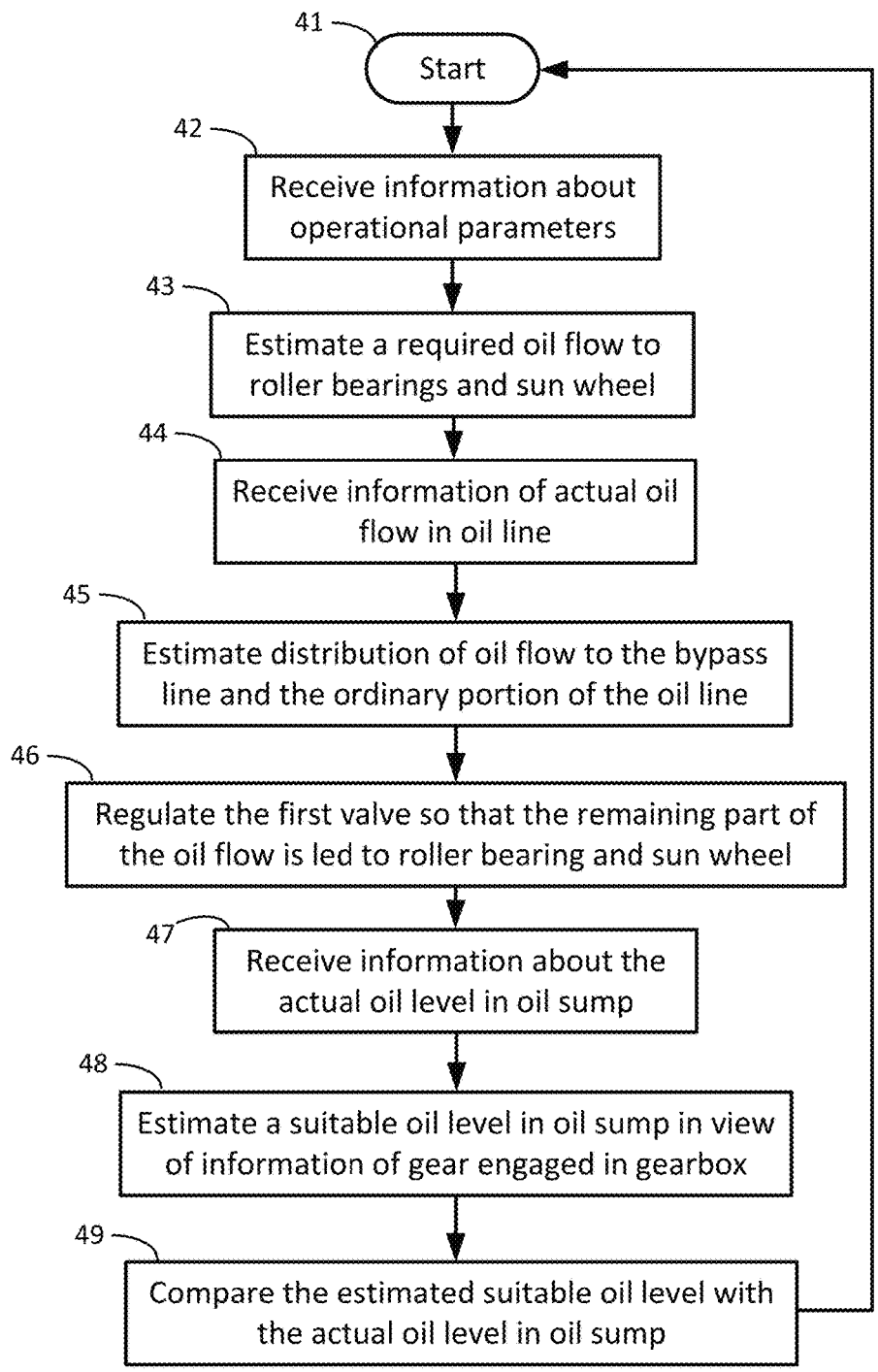
FIG. 3 shows a flow chart of a method for controlling the lubrication system.

FIG. 3 shows a flow chart of a method for controlling the lubrication system. The method starts at 41. The control unit 34 receives, at 42, information about the operational parameters 36-40. In this case, the parameters is the first parameter 36 related to the gear engaged in the gearbox 2, the second parameter 37 about the torque in the gearbox 2, the third parameter 38 about the inclination of the gearbox 2, the fourth parameter 39 about the oil temperature and the fifth parameter 40 about the topography of the road ahead. The control unit 34 may also receive information from other parameters such as properties about the used gearbox and stored data from previous operation of the gearbox 2. Furthermore, a parameter related to the activation of a retarder in the vehicle may also influence on the control of the lubrication system.

In view of said parameters 36-40, the control unit 34 estimates, at 43, a required oil flow to the roller bearings 18*a*-18*c* and the sun wheel 22*a*. It is important that the oil flow to the roller bearings 18*a*-18*c* and the sun wheel 22*a* is large enough to ensure a required lubrication and cooling but not too large. The flow losses in the oil channels 25*b*, 25*c* conducting oil to the roller bearings 18*a*-18*c* and the sun wheel 22*a* is much higher than in the bypass line 25*d*. Thus, a too large oil flow to the roller bearings 18*a*-18*c* and the sun wheel 22*a* results in increased flow losses and increased consumption of energy of the pump 27. Furthermore, a too large oil flow to the roller bearings 18*a*-18*c* also results in increased rolling losses in the roller bearings 18*a*-18*c*. Consequently, a too large oil flow to the roller bearings 18*a*-18*c* and the sun wheel 22*a* results in increased power losses in the gearbox 2 and a higher fuel consumption of the engine of vehicle 1 connected to the gearbox 2.

The control unit 34 is, at 44, provided with information of the actual oil flow in the oil line 25. This information can be based on the stroke volume and the actual speed of the pump 27. The control unit 34 estimates, at 45, the distribution of the oil flow to the bypass line 25d and the ordinary portion 25b, 25c of the oil line 25. A part of the oil flow is to be led to the bypass line 25d such that a remaining part of the oil flow, which corresponds to the estimated required oil flow is led to the roller bearing 18a, 18b, 18c and the sun wheel 22a. The control unit regulates, at 46, the first valve 30 such that said remaining part of the oil flow is led to the roller bearing 18a, 18b, 18c and the sun wheel 22a. Advantageously, it is possible to regulate the first valve 30 in a step-less manner in order to regulate the oil flow to the bypass line 25d and thereby the oil flow to the roller bearings 18a-18c and the sun wheel 22a with a high accuracy.

At 47, the control unit 35 receives information from the float 35 about the actual oil level in the oil sump 24. The control unit 34 estimates, at 48, a suitable oil level in the oil sump 24 in view of information of gear engaged in the gearbox 2. The primary gearwheels 5-10 on the counter shaft 4 are of different sizes and they have different immersion depth in the oil of the oil sump 24. At the suitable oil level, the primary gearwheel 5-10 of a gearwheel pair engaged in the gearbox 2 obtains an immersion depth in the oil at which it supplies oil to its meshing engagement with the secondary gearwheel in a quantity resulting in good lubrication and cooling. The primary gearwheels 5-10 obtain a rotary resistance in the oil which retards the rotary motion of the counter shaft 4. The rotary resistance of the counter shaft 4 results in power losses in the gearbox 2. Due to this fact, it is suitable to have an oil level in the gearbox 2 which is as low as possible but with a required lubrication and cooling of the components in the gearbox 2. When the torque in the gearbox 2 is transmitted via a large primary gearwheel 5, 6, it is possible to establish a lower oil level in the oil sump 24 than when the torque is transmitted via a small primary gearwheel 8-10. When the direct-drive gear is engaged in the gearbox 2, the torque is transmitted from the input shaft 3 to the main shaft 11 and thus not via the counter shaft 4 at all. In this case, it is possible to establish an oil level in the oil sump 24 below all primary gearwheels 5-10 and reduce the rotary motion of the counter shaft 4 in the oil in an optimal manner.

At 49, the control unit 34 compares the estimated suitable oil level with the actual oil level in the oil sump 24. In case there is a difference between the estimated suitable oil level and the actual oil level, the control unit 34 regulates primarily the second valve 33 in order to adjust the oil level such the estimated required oil flow to the roller bearing 18a-18c will be unaffected. If the oil level in the oil sump 24 is to be lowered, the first valve 30 is to be in a more or less open position such the reservoir 31 receives an oil flow from the oil sump 24. The control unit 34 sets the second valve 33 in a closed position such that all oil entering the reservoir 31 will be maintained. The control unit 34 receives information from the float 35 indicating when the suitable oil level in the oil sump 24 has been reached. If the first valve 30 is in a closed position, the control unit 34 can perform the lowering of the oil level at a later time when the roller bearings 18a-18c do not require the entire oil flow in the oil line 25.

If instead the oil level in the oil sump 24 is to be raised, the reservoir 31 is to be drained of oil. In this case, the control unit 34 sets primarily the second valve 33 in a maximum open position. Thereby, the oil flows out of the reservoir 31 and back to the oil sump 24 via the return line 32. In order to accelerate the establishment of the lower oil level, the control unit 34 may set the first valve 30 temporarily in a closed position. The control unit 34 receives information from the float 35 indicating when the raised suitable oil level in the oil sump 24 has been reached. Then the method restarts at 41.

Thus, the control unit 34 is able adjust the oil flow to the roller bearings 18a-18c and the sun wheel 22a and the oil level in the oil sump 24 in view of a number of parameters. By means of information 35 about the gear engaged in the gearbox 2, it is possible to adjust the oil level in the oil sump 24 in order to reduce the rotary resistance of the counter shaft 4 in the oil in an optimal manner at the same time as the roller bearings 18a-18c and the sun wheel 22a obtains a required lubrication and cooling. By means of information 36 of the torque transmitted via the gearbox 2, it is possible to supply an oil flow to the roller bearings 18a-18c and the sun wheel 22a providing a required lubrication and cooling at the same time as the flow losses and the rolling losses in the roller bearings 18a-c are at a low level. The information 38 about the inclination of the vehicle 1, makes it possible to adjust the oil level in the oil sump 24 when the vehicle 1 drives uphill or downhill. The information 39 about the temperature of the gearbox oil makes it possible to adjust the oil flow to the roller bearings 18a-18c and the sun wheel 22 in view of the oil temperature. Especially, the cooling properties of the oil varies with its temperature. The information 40 from a GPS unit about the topography of the road ahead, makes it possible to estimate the future requirement of cooling and lubrication of the roller bearings 18a-18c and estimate suitable future oil levels in the oil sump 24.

In case the vehicle comprises a retarder, it is possible to raise the oil level in the oil sump 24 when the retarder is activated. The raised oil level in the oil sump 24 results in an increased rotary resistance of the primary gearwheel. The increased rotary resistance adds a brake effect to the vehicle.

The invention is not restricted to the described embodiment but may be varied freely within the scope of the claims.

The invention claimed is:

1. A lubrication system for use in a gearbox, wherein the gear box comprises a main shaft, a counter shaft, a plurality of gear wheel pairs each comprising a primary gear wheel arranged on the counter shaft and a secondary gear wheel arranged on the main shaft, and wherein the lubrication system comprises:
an oil sump;
an oil line configured to lead oil from the oil sump to at least one component in the gearbox;
a pump for pumping oil through the oil line; a bypass line by which it is possible to lead a part of the oil flow in the oil line past said component and back to the oil sump;
a first valve configured to regulate the oil flow through the bypass line; and
a control unit configured to receive information from at least one parameter related to the oil flow to said component, to estimate a required oil flow to said component in view of said parameter and to regulate the first valve such that a part of the oil flow in the oil line is led to the bypass line and a remaining part of the oil flow, which corresponds to the required oil flow, is led to said component,
wherein the bypass line comprises a reservoir configured to store a variable amount of the oil in the gearbox in order to adjust the oil level in the oil sump and to reduce the rotary resistance of the primary gear wheel and the counter shaft in the oil.

2. A lubrication system according to claim 1, wherein the first valve is arranged in the bypass line.

3. A lubrication system according to claim 1, wherein the oil line has an extension from the oil sump to a component in the form of a roller bearing in the gearbox.

4. A lubrication system according to claim 3, wherein the oil line has an extension from the oil sump, via a main shaft in the gearbox, to a roller bearing supporting a gear wheel on the main shaft.

5. A lubrication system according to claim 1, wherein the lubrication system comprises a second valve by which the control unit regulates the oil flow from the reservoir to the oil sump.

6. A lubrication system according to claim 1, wherein the oil line comprises a return line configured to lead oil from the reservoir to the oil sump and that the reservoir is arranged in a position above the oil sump and that the lubrication system comprises a sensor configured to sense the oil level in the oil sump.

7. A lubrication system according to claim 1, wherein said parameter is one of the following parameters: the gear engaged in the gearbox, the torque transmitted through the gearbox, the temperature of the oil in the gearbox, the inclination of the gearbox, GPS information, properties of the used oil, properties of the used gearbox, stored data from previous operation of the lubrication system, the temperature of the surrounding, the temperature of a coolant in a cooling system used to cool the oil in the gearbox, and information of activation of a brake such as a retarder.

8. A method for controlling a lubrication system in a gearbox, wherein the gear box comprises a main shaft, a counter shaft, a plurality of gear wheel pairs each comprising a primary gear wheel arranged on the counter shaft and a secondary gear wheel arranged on the main shaft, and wherein the lubrication system comprises an oil sump an oil line configured to lead oil from the oil sump to at least one component in the gearbox, and a pump pumping oil through the oil line, wherein the method comprises:
    receiving information from at least one parameter related to the oil flow to the component in the gearbox;
    estimating a required oil flow to said component in view of said parameter;
    leading a part of the oil flow in the oil line to a bypass line and past said component and a remaining part of the oil flow, which corresponds to the required oil flow, is led to the component;
    storing a variable amount of oil in the gearbox in a reservoir arranged in the bypass line in order to adjust the oil level in the oil sump and to reduce the rotary resistance of the primary gear wheel and the counter shaft in the oil.

9. A method according to claim 8, further comprising regulating the oil flow to the component by means of first valve arranged in the bypass line.

10. A method according to claim 8, further comprising leading oil to a component in the form of a roller bearing supporting a gear wheel on the main shaft in the gearbox.

11. A method according to claim 10, further comprising:
    regulating the oil flow from the reservoir to the oil sump by means of a second valve;
    leading the oil from the reservoir to the oil sump via a return line; and
    arranging the reservoir in a position above the oil sump.

12. A method according to claim 8, further comprising:
    receiving information of actual oil level in the oil sump;
    estimating a suitable oil level in oil sump by means of said parameter; and
    adjusting the stored amount of the oil in the reservoir such that the oil level in the oil sump is adjusted to the suitable oil level.

13. A method according to claim 8, further comprising receiving information from at least one of the following parameters: the gear engaged in the gearbox, the torque transmitted through the gearbox, the temperature of the oil in the gearbox, the inclination of the gearbox, GPS information of the road ahead, properties of the used oil, properties of the used gearbox, stored data from previous operation of the lubrication system, the temperature of the surrounding, the temperature of a coolant in a cooling system used to cool the oil in the gearbox, and information of activation of a brake such as a retarder.

14. A gearbox comprising:
    a main shaft;
    a counter shaft;
    a plurality of gear wheel pairs each comprising a primary gear wheel arranged on the counter shaft and a secondary gear wheel arranged on the main shaft; and
    a lubrication system comprising:
        an oil sump;
        an oil line configured to lead oil from the oil sump to at least one component in the gearbox;
        a pump for pumping oil through the oil line;
        a bypass line by which it is possible to lead a part of the oil flow in the oil line past said component and back to the oil sump;
        a first valve configured to regulate the oil flow through the bypass line; and
        a control unit configured to receive information from at least one parameter related to the oil flow to said component to estimate a required oil flow to said component in view of said parameter and to regulate the first valve such that a part of the oil flow in the oil line is led to the bypass line and a remaining part of the oil flow, which corresponds to the required oil flow, is led to said component,
        wherein the bypass line comprises a reservoir configured to store a variable amount of the oil in the gearbox in order to adjust the oil level in the oil sump and to reduce the rotary resistance of the primary gear wheel and the counter shaft in the oil.

15. A gearbox according to claim 14, wherein the first valve of said lubrication system is arranged in the bypass line.

16. A gearbox according to claim 14, wherein the oil line has an extension from the oil sump to a component in the form of a roller bearing in the gearbox.

17. A vehicle comprising:
    a gearbox comprising:
        a main shaft;
        a counter shaft; and
        a plurality of gear wheel pairs each comprising a primary gear wheel arranged on the counter shaft and a secondary gear wheel arranged on the main shaft; and
    a lubrication system comprising:
        an oil sump;
        an oil line configured to lead oil from the oil sump to at least one component in the gearbox;
        a pump for pumping oil through the oil line;

a bypass line by which it is possible to lead a part of the oil flow in the oil line past said component and back to the oil sump;

a first valve configured to regulate the oil flow through the bypass line; and a control unit configured to receive information from at least one parameter related to the oil flow to said component to estimate a required oil flow to said component in view of said parameter and to regulate the first valve such that a part of the oil flow in the oil line is led to the bypass line and a remaining part of the oil flow, which corresponds to the required oil flow, is led to said component, wherein the bypass line comprises a reservoir configured to store a variable amount of the oil in the gearbox in order to adjust the oil level in the oil sump and to reduce the rotary resistance of the primary gear wheel and the counter shaft in the oil.

18. A vehicle according to claim 17, wherein the first valve of said lubrication system is arranged in the bypass line.

19. A vehicle according to claim 17, wherein the oil line has an extension from the oil sump to a component in the form of a roller bearing in the gearbox.

\* \* \* \* \*